Dec. 31, 1957  E. P. HARRIS ET AL  2,817,875
MOLD FOR MOLDING RUBBER FOAM LATEX STRIPS AND THE LIKE
Filed Jan. 18, 1954  2 Sheets-Sheet 1
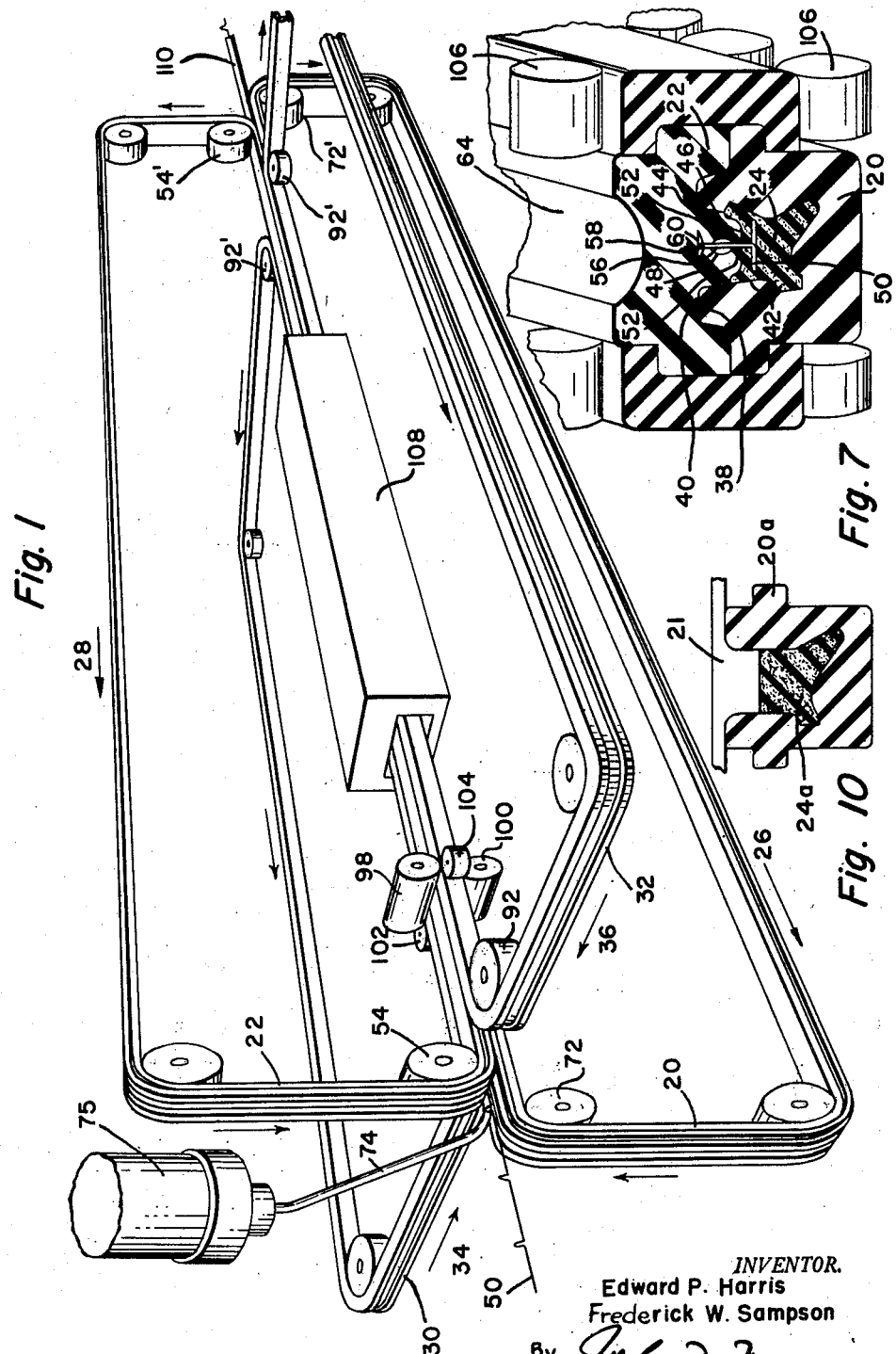
INVENTOR.
Edward P. Harris
Frederick W. Sampson
By *John T. Narram*
Attorney

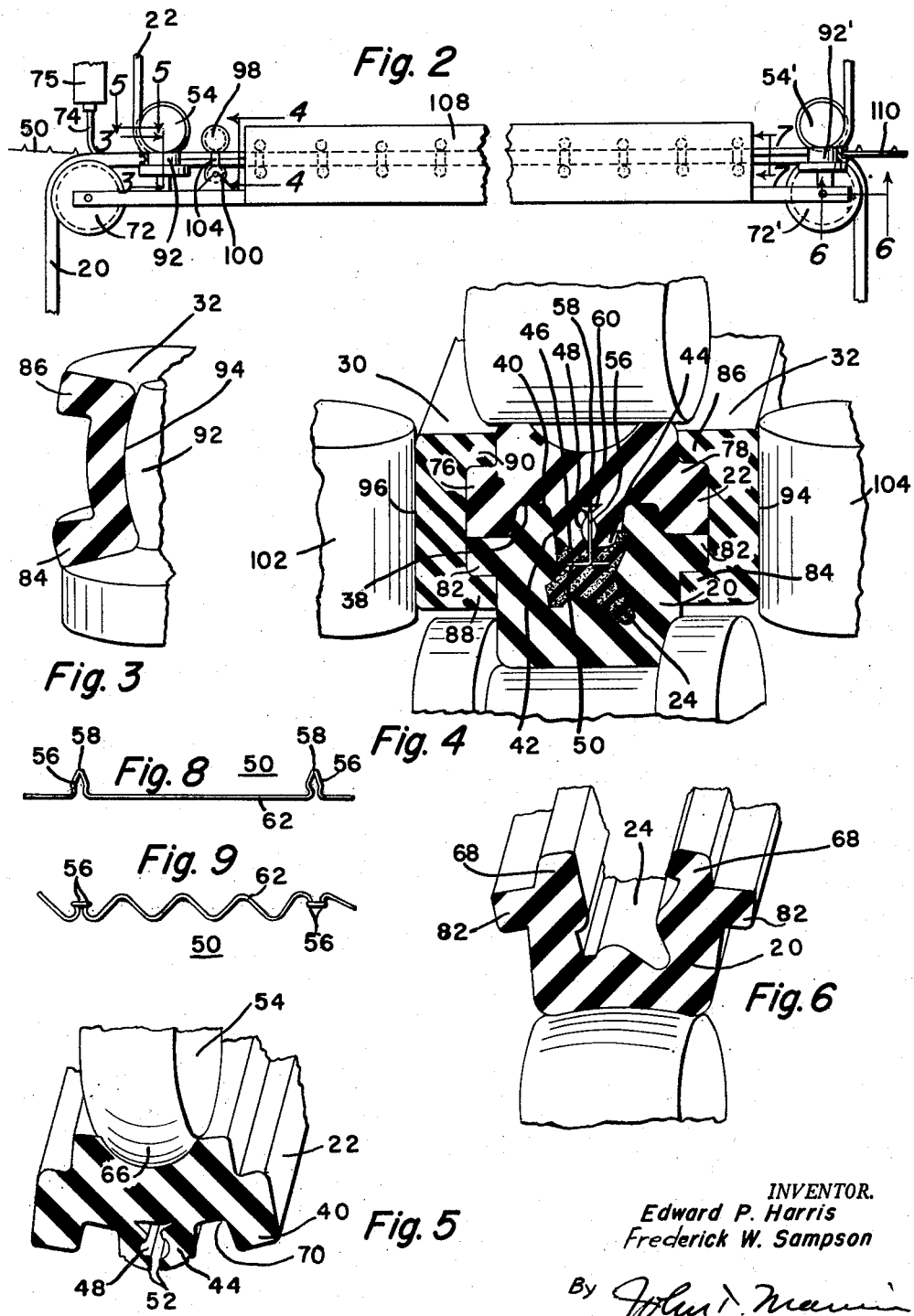

United States Patent Office 2,817,875
Patented Dec. 31, 1957

2,817,875
MOLD FOR MOLDING RUBBER FOAM LATEX STRIPS AND THE LIKE

Edward P. Harris and Frederick W. Sampson, Dayton, Ohio, assignors to General Motors Corporation, Detroit, Mich., a corporation of Delaware Application January 18, 1954, Serial No. 404,649

4 Claims. (Cl. 18—4)

This invention relates to a mold for making elongate strips of moldable material.

More specifically the invention is directed to operations on latex foam and other similar materials.

When latex or similar materials are molded in elongated mold cavities, problems arise in filling the mold which require close control and limit the length of mold that can be used.

Therefore one object of the present invention is to provide a mold wherein an elongated open mold cavity is progressively closed and filled with a flowable foamy moldable material at a low but highly uniform internal pressure throughout the length of the molded cavity. Specifically, the method of this invention comprehends the injection of the foamy flowable material from a nozzle into a moving closed mold cavity at a substantially constant and desired low pressure while simultaneously and relatively moving the nozzle along the length of the mold cavity. Thus an even distribution of the foamy material throughout the mold cavity is obtained at any desired low internal pressure of the material.

Another object of the present invention is to provide apparatus for progressively closing and moving and molding a strip of molded foamy flowable material by continuously filling a mold cavity from a relatively stationary filling nozzle that extends into the closed mold cavity through an opening formed between two endless flexible separated mating mold parts that are progressively mated and clamped in engagement with each other at a point anterior to the point of entry of the nozzle and posterior to the point of delivery of the nozzle so the mold cavity, which is formed from portions of each of mating mold parts, may be progressively and completely filled with a foamy material that flows directly from the nozzle into the mold cavity.

A further object of the present invention is to provide a mold of flexible elastomeric material that is adapted for molding a continuous elongated strip from fluid foamy material wherein two separated endless flexible mold parts become mated along a length thereof and contribute to define a portion of a mold cavity that is held closed when the mold parts are placed in mating relation and a pair of mold clamps are applied and engage lugs located on the exterior portions of said mating mold portions for maintaining the mating relation between the mold parts so that a filling nozzle which extends into the mold cavity through the space provided between the separated mold parts may continuously fill the cavity of the mold as the mold parts and clamps are moved relative thereto.

A still further object of the present invention is to provide two mating mold parts of indeterminate length wherein each have a pair of integrally formed portions that interlock and hold the parts in mating relation and define at least a portion of an extending mold cavity and wherein one of said mold parts is formed of flexible material and has a continuously longitudinally extending split that is laterally opened when the mold part is laterally flexed so that a reinforcing insert may be positioned and held therein when the mold part resumes its normal shape so that a reinforced strip may be formed in the mold cavity after the mold parts are clamped in mating relation by a pair of mold clamps that engage the lugs on the outer portions of said mold parts.

Further objects and advantages of the present invention will be apparent from the following description, reference being had to the accompanying drawings wherein a preferred embodiment of the present invention is clearly shown.

In the drawings:

Figure 1 is a view in perspective of one embodiment of the invention.

Figure 2 is a side view of a portion of the apparatus shown in Figure 1 and specifically shows the location of the filling nozzle, the mating mold parts and the clamps therefor.

Figure 3 is a fragmentary view in perspective along line 3—3 in Figure 2.

Figure 4 is a fragmentary view partially in section taken on line 4—4 in Figure 2.

Figure 5 is a view along 5—5 in Figure 2 and shows the lateral flexing by a roller of one of the mold parts.

Figure 6 is a view along line 6—6 in Figure 2 and shows a lateral spreading of the other mold part.

Figure 7 is a view along line 7—7 in Figure 2 and shows the assembled mold parts and clamps as guided by suitable rollers.

Figures 8 and 9 show a reinforcing element that is held in the mold part shown in Figure 5.

Figure 10 shows a modification of the apparatus used in Figure 1.

In the drawings wherein the various parts of the apparatus of the present invention are diagrammatically shown, the numerals 20 and 22 respectively designate two endless flexible mold parts; preferably made of suitable elastomeric material, that are adapted to mate with each other and define a mold cavity 24 of desired cross-sectional shape extending continuously throughout its length. The specific form illustrated in the drawings may have a cross-section designed to mold a sponge rubber automobile door sealing strip of the type disclosed in Patent 2,579,072, filed March 15, 1951, by Edward P. Harris, as assigned to the assignee of the present invention.

Mold part 20 and mold part 22 travel respectively in the directions as indicated by arrows 26 and 28 and move from a separated to a mating relation with each other. The parts are held together by clamps 30 and 32 which travel in the direction of the arrows 34 and 36 (Fig. 1). It is to be noted that the rate of travel of the mold parts 20 and 22 and clamps 30 and 32 are all equal. This movement is actuated and maintained by a driving means, not shown so that the various parts may be held together as shown in Figures 4 and 7.

Mold part 20 has a surface 38 that is complementary in shape to surface 40 on mold part 22 so that the parts 20 and 22 may be placed in mating engagement. A recess 42, formed in surface 38 of mold part 20, is suitably shaped so as to decine a portion of mold cavity 24 and receives a projection 44 formed on surface 40 of mold part 22 therein, which is sized to be tightly received in a portion of recess 42 and has a terminal end 46 shaped as shown to completely define the mold cavity 24 when the projection 44 is positioned in recess 42.

A continuous wire reinforcing member 50 may be provided for the strip to be formed. This wire 50, when used is held clamped in proper position within the mold of cavity 24 as follows: at the terminal end of projection 46 and adjacent mold cavity 24 a continuous longitudinally extending split 48 defines two mutually opposed longitudinally extending projections 52 whose end surfaces are slightly yieldable and are preferably in pressure contact with each other when the mold part 22 is not flexed, but are spread apart when the mold 22 is flexed by a suitable roller 54 as shown in Figure 1 in a manner to be hereinafter described. These projections 52 when spread apart permit the series of longitudinally spaced spring tongues or clips 56 on reinforcing wire 50 to pass therebetween, and then as the flexing pressure on mold part 22 is released, the engaging portions 52 move together and the series of spring tongues 56 are clamped firmly therebetween. When the reinforcing wire 50 is located in cavity 24, the lower tips 58 engage the bottom 60 of split 48 so that the main or zig-zag portion 62 of the reinforcing wire 50 is properly vertically located above the bottom of mold cavity 24 so as to be later embedded in the material molded in the cavity. The continuous longitudinal split 48 as located between the projections 52 does not form a part of the mold cavity 24 since the projections 52 press directly against each other between the longitudinally spaced spring tongues 56 when the mold is closed, as in Figures 4 and 7.

Mold part 22 has a continuous groove-like portion formed along the outer surface that is remote from the projection 44 so a tread 66 on the tapered exterior periphery of roller 54 may ride therein and as the moving mold part is laterally flexed as the part 22 bends around the roller 54 when the part is thus flexed, the projections 52 separate for receiving the reinforcing wire 50 therebetween. The flexure of mold part 22 also causes lugs 68 which are located on surface 38 of mold part 20 to disengage from recesses 70 as located on surface 40 of mold part 22. In the particular embodiment shown only a single roller 54 is used to spread the mold part 22. It is readily apparent that a plurality of rolls may be used so as to accomplish the purpose providing sufficient tension is maintained upon the mold part 22 as it travels over the rolls 54 to cause the lateral flexing of the mold part 22 when the outer surface of the mold part 22 assumes the peripheral shape of the roller 54. Of course as the mold part 22 moves continuously past the flexing roller 54, the distorting pressure on the mold part 22 is relieved and the part 22 tends to progressively return to its normal shape as the part 22 travels forward.

Referring now to Figures 1 and 2, as mold part 22 travels over flexing roller 54 and mold part 20 passes over a guiding roller 72 the parts 20 and 22 are brought from a separated to a mating relation with each other. An opening, located between the separated parts is utilized to properly pass both the reinforcing wire 50 and a conduit 74 for the molding material directly into the mold cavity 24. Conduit 74 leads from the supply 75 containing the flowable molding material longitudinally between the separated mold parts 20 and 22 to an outlet nozzle, not shown, that is positioned within mold cavity 24 as formed between the mated mold halves 20 and 22.

When it is desired to fill cavity 24, the nozzle portion of conduit 74 delivers the molding material at a substantially atmospheric pressure to the central portion of the cross-section of the mold cavity 24 in the direction of the travel of the mold parts 20 and 22. As the nozzle preferably extends longitudinally a sufficient distance within the cavity 24 as to deliver the molding material into the cavity 24 at a point where the mold parts 20 and 22 are mated and clamped by mold clamps 30 and 32, in a manner to be hereinafter described. The escape of the molded material between the surfaces 38 and 40 of the mold parts and into the dividing split 48 in mold part 22 is thereby minimized and a more perfect strip is thus subsequently formed.

Mold clamps 30 and 32 engage lugs on the outer surface portions of mold parts 20 and 22 as are placed in mating relation by rollers 54 and 72. So that this clamping action may be accomplished, a pair of lugs 76 and 78 are provided on the exterior portions of mold part 22 contiguous to surface 40 and similarly a pair of lugs 80 and 82 are provided on mold part 20. The clamps 30 and 32 each engage one of a pair of lugs on mold parts 20 and 22 thus the clamping portions 88 and 90 of clamp 30 are applied to engage lugs 82 and 76 and clamping arms 84 and 86 of mold clamp 32 engage lugs 80 and 78 and when the clamps 30 and 32 are so applied they securely maintain the mold parts 20 and 22 in mating relation and mold cavity 24 closed. To facilitate the application of clamps 30 and 32, a plurality of rollers 92 that have their peripheral rim portions curved as shown in Figure 3 are utilized. The curved portion of rollers 92 engages the substantially straight back portion 94 of mold clamp 32 and the back portion 96 of clamp 30 so as to flex the elastomeric material of the clamps and thereby spread the respective clamping portions of the mold clamps.

From the foregoing it is apparent that after the mold parts 20 and 22 and clamps 30 and 32 have travelled past the rollers 92, the parts while being assembled on one another will not be in tight engagement. To achieve a tight engagement, the mold parts 20 and 22 are passed between rollers 98 and 100 and are forced into tight mating engagement. Simultaneously the mold clamps 30 and 32 are forced into engagement with the exterior portions of the mold parts 20 and 22 by rollers 102 and 104 so that all of the parts will be assembled and clamped as shown in Figure 4 of the drawings.

The reinforcing wire 50 is guided into proper position in slit 48 in mold part 22 by a suitable apparatus, not shown, and at its point of entry into the mold cavity is directed past the upper side of nozzle 74 into a position so that the wire 50 is properly centered in the mold cavity 24 with its longitudinally depending spring tongues 56 guided in a vertical position so as to accurately pass between the clamping projection 52 on mold part 22. The endless elastomeric mold parts 20 and 22 and elastomeric mold clamps 30 and 32 are driven continuously at a uniform and coordinating speed and are kept under continuous tension by any suitable driving and/or tensioning means, not shown, and may be guided by any suitable roller 106 as in Figure 7 which may be placed along their length if required. These rollers are adapted to further maintain the parts in mating clamped relation.

After the mold cavity is clamped and filled, it may pass through an elongated chamber 108 that may be heated if desired to any suitable temperature to set or gell the foamy material. This set material may also be progressively and continuously cured in the same chamber if desired. The time period for setting and curing is determined by the quantity and type of gelling agent, vulcanizing agent, etc., and the rate of travel of the mold parts 20 and 22 and the effective temperature and length of the chamber as well as the curing characteristics of the material to be formed. After passing through chamber 108, the mold clamps 30 and 32 are removed by roller 92' and mold parts 20 and 22 are again separated by rollers 72' and 54' so as to expose mold cavity 24 in order to permit the strip 110 to be continuously removed from the part 20 which continues to travel at its normal speed. In this connection it is to be noted that the rollers 54', 72' and 92' are of similar shape and perform in reverse the operations which rollers 54, 72 and 92 impart to the mold parts 22, 20 and mold clamps 30 and 32 respectively so that the mold clamps 30 and 32 are released from clamping engagement with mold parts 20 and 22 so the mold parts 20 and 22 may be separated to facilitate the removal of the strip 110 from the mold cavity 24 at a speed of travel of the mold part 20. When the mold part 22 passes over roller 54' and is flexed thereby, the wire clamping projections 52 are also separated from each other so as to release their grip upon the wire tongues 56 so that the strip may remain in the portion of the mold cavity 24 as defined in mold part 20 and may be led from the exit thereof by a suitable guiding means, not shown, such as a roll, belt, conveyor, etc.

The apparatus and method described above is particularly suitable for making sponge rubber strips from foam latex compound. Such foam latex compounds when in an ungelled condition are flowable to any desired degree and can be easily injected through a filling nozzle 74 at a constant rate of flow to progressively fill the mold cavity at a uniform desired pressure. The internal pressure within the mold cavity need be no higher than that required to insure the complete filling of the mold cavity 24.

Further it is apparent the mold cavity may be filled before it is closed and clamped. This may be accomplished by flowing the fluid latex material directly from a nozzle into the open cavity 24A in mold part 20 using a doctor blade 21 as in Figure 10 that is shaped to progressively scrape off any excess foam latex that may be present in the open cavity 24A so that a proper fill is assured. Closure of the cavity 24A by mold half 22 properly conforms the upper surface of the foam to the desired contour of the closed mold cavity. The mold half 22 may carry a reinforcing wire element if desired and subsequent clamping together of the mold half is performed as hereinbefore disclosed. The ungelled flowable foam latex compound as it flows from nozzle 74 will flow around and fully embed all the portions of reinforcing wire 50 which extends within the mold cavity 24.

The specific compound and material used in the molding operation forms no part of this invention and the foregoing is merely exemplary of some of the many materials that may be used. It is apparent that the apparatus may be adjusted for any desired rate of travel and the length of heating chamber 108 and the temperature thereof may be controlled to yield any desired result as is well known in the art.

The specific material used in the mold parts 20 and 22 and the mold clamps 30 and 32 may be of any suitable length of suitable elastomeric material such as butadiene styrene copolymers, butadiene acrylonitrile copolymers, natural rubber, etc., mixtures of any of the above, or any other suitable material providing the material selected will have the proper degree of flexibility for the application involved and be able to withstand the temperatures of the setting or curing. In this connection it is understood that the heating apparatus forms no part of this invention and merely facilitates the explanation thereof since heating is a necessary step in the curing of rubber-like compounds. If the compound used requires no cure the heating step and apparatus may be eliminated.

In connection with the apparatus set forth herein it is to be noted that other apparatus may be used to form strips similar to the type herein disclosed. These are disclosed in applications Serial Numbers 404,554, 404,668, 404,566, and 404,576, now Patent No. 2,764,084, currently filed herewith and assigned to the assignee of the present invention; and further another method and apparatus for forming strips similar to the type disclosed herein is set forth in copending application Serial No. 191,444, now Patent 2,668,987 assigned to the assignee of the present invention.

While the embodiment of the present invention herein disclosed, constitutes a preferred form, it is to be understood that other forms might be utilized all coming within the scope of my invention as set forth in the claims.

What is claimed is as follows:

1. A mold of flexible elastomeric material for molding a continuous elongated strip from fluid foamy material comprising in combination; a continuous flexible mold part of indeterminate length longitudinally extending and having a continuous exposed cavity of predetermined shape along a surface portion thereof and a pair of continuously and longitudinally extending lugs on external surface portions of said mold contiguous said mold cavity surface, a second continuous and longitudinally extending flexible mold part of indeterminate length having a continuous exposed cavity of predetermined shape along one surface adapted to mate with the cavity in said first mentioned mold part for forming a closed longitudinally extending mold cavity when the mold parts are placed in mating relation along the cavity surfaces thereof, said second mold part having a pair of continuous longitudinally extending lugs on the exterior portions of said mold part contiguous to said cavity surface, and a pair of continuous and longitudinally extending clamping means adapted to be progressively transversely flexed and longitudinally applied to and engage one of each pair of said lugs for maintaining said mold parts in mating relation and said mold cavity closed.

2. A mold of flexible elastomeric material for molding a continuous elongated strip from fluid foamy material comprising in combination; a continuous and longitudinally extending flexible mold part of indeterminate length having a continuous exposed cavity of predeterminate shape along a surface portion thereof, and a pair of continuous and longitudinally extending lugs on the external surface portions of said mold contiguous said mold cavity surface, a second continuous and longitudinally extending flexible mold part of indeterminate length having a continuously extending exposed mold cavity of predetermined shape along one surface adapted to mate with the cavity in said first mentioned mold part for forming a longitudinally extending closed mold cavity when the mold parts are placed in mating relation along the cavity surfaces thereof, said second mold part having a pair of continuous and longitudinally extending lugs on the exterior surface portions of said mold part contiguous said cavity surface, a continuously longitudinally extending split in one of said mold parts adapted to be laterally opened when said mold part is laterally flexed, said split being proximate said mold cavity and adapted for retaining the reinforcing element for said strip therein and a pair of continuous and longitudinally extending clamping means adapted to progressively be transversely flexed and to be progressively longitudinally applied to said mold parts and engage one of each pair of said lugs for maintaining said mold parts in mating relation and said mold cavity closed and maintaining a reinforcing element in position when said element is inserted into said split.

3. An apparatus for molding an elongate strip of fluid foamy material comprising in combination; an elongated endless travelling flexible mold part of elastomeric material having a longitudinally extending mold cavity along one surface thereof and a pair of continuously extending lugs on external surface portions contiguous said mold cavity surface, a second elongated endless travelling mold part of elastomeric material having a longitudinally extending exposed cavity therein adapted to form an elongate mold cavity with said first mentioned cavity when said mold parts are brought into mating relation, said second mold part having a pair of opposed lugs on the external surface portions contiguous said cavity surface, means for moving said mold parts lengthwise and progressively bringing said parts from a separated into a mating relation while said mold parts continue to travel longitudinally a pair of continuous longitudinally extending mold clamps each adapted to be progressively transversely flexed and longitudinally, applied to said mold parts and to engage one of each pair of lugs for holding said mold parts in clamped mating relation, means for transversely flexing said mold clamps, means for applying said clamps to said moving mold parts, a relatively stationary filling nozzle having a portion thereof extending between said separated parts and another portion extending into the mold cavity after the mold portions are in close clamping relation, means for flowing a moldable material through said nozzle into said mold cavity and progressively filling same lengthwise while said mold parts continue to travel, means for progressively transversely flexing and removing said mold clamps and separating said mold parts after said mold parts have closed over a sufficient length of travel to permit the moldable material contained therein to set to a desired degree and thereby conform to the shape of the mold cavity and means for progressively removing said formed strip from the mold cavity.

4. An apparatus for molding an elongate strip of fluid foamy material comprising in combination; two continuous and longitudinally extending flexible mating mold parts of indeterminate length each having a pair of continuous and longitudinally extending lugs on the external surface portions thereof and each having a portion thereof shaped for defining at least a portion of a continuously extending mold cavity when said parts are in mating relation, a continuous longitudinally extending split in one of said mold parts adapted to be opened when said part is laterally flexed, said split being proximate said mold cavity and adapted for receiving a reinforcing element for said strip therein, two continuous and longitudinally extending flexible mold clamps of indeterminate length each adapted to be transversely flexed and progressively applied to said mold parts and engage one of each pair of said lugs for holding said lug portions clamped in mating relation and said mold cavity closed, means for leading said reinforcing element into said split, means for progressively moving said mold parts lengthwise progressively from a separated relation into a mating relation means for transversely flexing said clamps, means for progressively applying said clamps to said mated parts while said parts continue to travel, a relatively stationary filling nozzle having a portion thereof extending between said separated parts and having another portion thereof extending into the mold cavity after the mold portions are in mating relation and said mold cavity is closed, means for flowing a moldable material through said nozzle into said cavity and progressively filling the same lengthwise while said mold parts continue to travel, means for transversely flexing and removing the said mold clamps and separating said mold parts after said mold parts have sufficient length of travel to permit the moldable material contained therein to set to desired degree and thereby form a strip having the shape of the mold cavity, and means for progressively moving said formed strip from the mold cavity.

References Cited in the file of this patent

UNITED STATES PATENTS

| | | |
|---|---|---|
| 1,465,326 | Zimmer | Aug. 21, 1923 |
| 2,668,987 | Harris et al. | Feb. 16, 1954 |